(12) United States Patent
Batson et al.

(10) Patent No.: US 12,334,514 B2
(45) Date of Patent: *Jun. 17, 2025

(54) CYLINDRICAL ELECTROCHEMICAL CELLS AND METHOD OF MANUFACTURE

(71) Applicant: Lithium Werks Technology BV, Enschede (NL)

(72) Inventors: David C. Batson, Winchester, MA (US); Rex Withers, Mashpee, MA (US); James E. Dawson, Macomb, MI (US)

(73) Assignee: Lithium Werks Technology BV, Enschede (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,644

(22) Filed: Mar. 31, 2023

(65) Prior Publication Data

US 2023/0253631 A1 Aug. 10, 2023

Related U.S. Application Data

(63) Continuation of application No. 16/519,836, filed on Jul. 23, 2019, now Pat. No. 11,631,902, which is a
(Continued)

(51) Int. Cl.
*H01M 10/0587* (2010.01)
*H01M 10/04* (2006.01)
(Continued)

(52) U.S. Cl.
CPC ... *H01M 10/0587* (2013.01); *H01M 10/0431* (2013.01); *H01M 10/052* (2013.01); *H01M 10/0525* (2013.01)

(58) Field of Classification Search
CPC ........... H01M 10/0587; H01M 10/052; H01M 10/0525; H01M 10/0431
See application file for complete search history.

(56) References Cited

U.S. PATENT DOCUMENTS

| 5,972,532 A | 10/1999 | Oweis et al. |
| 6,328,769 B1 | 12/2001 | Oweis et al. |
| (Continued) | | |

FOREIGN PATENT DOCUMENTS

| CN | 1728435 | 2/2006 |
| CN | 101026248 | 8/2007 |
| (Continued) | | |

OTHER PUBLICATIONS

Batson et al., U.S. Appl. No. 61/932,484, filed Jan. 28, 2014, titled "Cylindrical Electrochemical Cells and Method of Manufacture", 47 pages.
(Continued)

*Primary Examiner* — Christopher P Domone
(74) *Attorney, Agent, or Firm* — Wells St. John P.S.

(57) ABSTRACT

An electrochemical storage cell may comprise first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges, first and second separator sheets mechanically and electrically separating the coated opposing surfaces of the first and second electrode sheets and mechanically and electrically separating the cylindrical core and the coated opposing surfaces of the first electrode sheet, and slotted cutouts from the uncoated conductive edges, the slotted cutouts angularly co-located relative to the cylindrical core upon forming the jellyroll structure.

37 Claims, 13 Drawing Sheets

Related U.S. Application Data continuation of application No. 15/115,220, filed as application No. PCT/US2015/010912 on Jan. 9, 2015, now Pat. No. 10,381,688.

(60) Provisional application No. 61/932,484, filed on Jan. 28, 2014.

(51) Int. Cl.
*H01M 10/052* (2010.01)
*H01M 10/0525* (2010.01)

(56) References Cited

U.S. PATENT DOCUMENTS

| | | | |
|---|---|---|---|
| 6,896,993 | B2 | 3/2005 | Hozumi et al. |
| 7,364,817 | B2 | 4/2008 | Lee et al. |
| 7,700,222 | B2 | 4/2010 | Kozuki |
| 7,867,651 | B2 | 1/2011 | Riley, Jr. et al. |
| 7,927,732 | B2 | 4/2011 | Myerberg et al. |
| 7,939,201 | B2 | 5/2011 | Chiang et al. |
| 7,955,736 | B2 | 6/2011 | Cheon et al. |
| 8,057,936 | B2 | 11/2011 | Chiang et al. |
| 8,084,158 | B2 | 12/2011 | Chu et al. |
| 8,119,280 | B2 | 2/2012 | Gardner et al. |
| 8,158,090 | B2 | 4/2012 | Chiang et al. |
| 8,236,441 | B2 | 8/2012 | Gardner et al. |
| 8,323,832 | B2 | 12/2012 | Chiang et al. |
| 8,389,154 | B2 | 3/2013 | Myerberg et al. |
| 8,501,345 | B2 | 8/2013 | Gardner et al. |
| 8,617,430 | B2 | 12/2013 | Chiang et al. |
| 10,381,688 | B2 * | 8/2019 | Batson .............. H01M 10/0431 |
| 11,631,902 | B2 | 4/2023 | Batson et al. |
| 2005/0008933 | A1 | 1/2005 | Ligeois et al. |
| 2005/0287428 | A1 | 12/2005 | Cheon et al. |
| 2006/0024572 | A1 | 2/2006 | Lee et al. |
| 2006/0147793 | A1 * | 7/2006 | Kim ................... H01M 50/536 |
| | | | 429/211 |
| 2006/0257735 | A1 | 11/2006 | Kim |
| 2007/0196730 | A1 * | 8/2007 | Kozuki .............. H01M 50/538 |
| | | | 429/185 |
| 2009/0047580 | A1 | 2/2009 | Takagi et al. |
| 2011/0123857 | A1 * | 5/2011 | Hwang ............ H01M 10/0463 |
| | | | 429/185 |
| 2012/0251854 | A1 | 10/2012 | Kusama et al. |
| 2012/0328924 | A1 | 12/2012 | Miyazaki |
| 2013/0216879 | A1 * | 8/2013 | Egawa ................ H01M 10/052 |
| | | | 429/94 |
| 2014/0045041 | A1 | 2/2014 | Kim et al. |
| 2016/0351966 | A1 | 12/2016 | Batson et al. |
| 2019/0348719 | A1 | 11/2019 | Batson et al. |

FOREIGN PATENT DOCUMENTS

| | | |
|---|---|---|
| CN | 101106205 | 1/2008 |
| CN | 203260684 | 10/2013 |
| CN | 201580006073.4 | 5/2018 |
| CN | 201910635179.0 | 12/2021 |
| CZ | PV 2016-514 | 10/2021 |
| EP | 0955682 | 11/1999 |
| EP | 1223592 | 7/2002 |
| JP | H10-40947 | 2/1988 |
| JP | H11-283606 | 10/1999 |
| JP | H11-307076 | 11/1999 |
| JP | 2000-268803 | 9/2000 |
| JP | 2004-095487 | 3/2004 |
| JP | 2007-227137 | 9/2007 |
| JP | 2008-016411 | 1/2008 |
| JP | 2008-159530 | 7/2008 |
| JP | 2011-159518 | 8/2011 |
| JP | 2011-238569 | 11/2011 |
| WO | PCT/US2015/010912 | 8/2016 |

OTHER PUBLICATIONS

Offer et al., "Cool Metric for Lithium-Ion Batteries Could Spur Progress", Nature vol. 582, Jun. 2020, United Kindgom., pp. 485-487.

White, "Tesla 'Tabless' Cells—Not New, But Very Important", available online at https://www.linkedin.com/pulse/tesla-tabless-cells-new-very-important-david-white/, 2020, 5 pages.

Youtube, "Tesla Battery Day", available online at https://youtu.be/I6T9xIeZTds?t=4124, 2020, 3 pages.

Zhao et al., "Modeling the Effects of Thermal Gradients Induced by Tab and Surface Cooling on Lithium Ion Cell Performance", Journal of The Electrochemical Society, 165 (13), 2018, United States, pp. A3169-A3178.

* cited by examiner

CYLINDRICAL ELECTROCHEMICAL CELLS AND METHOD OF MANUFACTURE

This application is a continuation of and claims priority to U.S. patent application Ser. No. 16/519,836, which was filed Jul. 23, 2019, which is a continuation of and claims priority to U.S. patent application Ser. No. 15/115,220, which was filed Jul. 28, 2016, now U.S. Pat. No. 10,381,688, which is a 35 U.S.C. § 371 of and claims priority to PCT International Application No. PCT/US2015/010912, which was filed Jan. 9, 2015, and which claims the benefit of U.S. Provisional Application Ser. No. 61/932,484, which was filed Jan. 28, 2014, and the teachings of which are incorporated herein by reference.

TECHNICAL FIELD

This disclosure relates to an electrochemical cell, and more particularly, to fabrication of an electrochemical cell providing equivalent or increased electrical and thermal performance and reduced manufacturing cost.

BACKGROUND AND SUMMARY

In order to produce a high power cylindrical electrochemical cell with low electrical impedance, current production techniques require multiple electrically conducting tabs to be attached, normally by welding, to the electrode substrate foil at several points along the electrode length. In order to decrease the cell impedance, the number of tabs are increased accordingly.

Several conventional methods of discrete tab attachment are currently employed in the manufacture of electrochemical storage cells, electrochemical capacitors, electrolytic capacitors, dry film capacitors and similar electrical devices. Conventional methods for discrete tab attachment include removing a coating in regions on both sides of a coated electrode and welding tabs to the exposed uncoated regions, and subsequently applying an insulating cover layer over the welded tab and the exposed foil on the opposite side of the electrode from the tab. In other conventional methods, the coating removal step may be avoided by partially coating the electrode surfaces, leaving uncoated coating-free electrode edge foils. Furthermore, tabs may be adhered to or alternately, cut out and formed from uncoated electrode regions. Insulating tape may then be applied to cover the tabs in order to prevent electrical shorting at the tab edges. Conventional methods for providing electrical connection of the electrodes to the wound electrode assembly without discrete tabs include blind through welding of coating-free edge foils to a plate. Electrical connection may also be provided by holding a plate in mechanical compression against the uncoated electrode foil edges.

The inventors herein have recognized potential issues with the above approaches. Namely, with the use of discrete tabs, electrical current may be channeled to a small area of the tabs at discrete points along the electrode, creating areas that may operate at significantly higher temperature than the remainder of the electrode due to high localized ohmic heating. Furthermore, cell amp-hour (Ah) capacity is reduced overall due to the uncoated regions for tab attachment, localized differences in the anode to cathode capacity ratio in the uncoated regions may cause localized lithium plating in the case of the Li-ion battery cell chemistry. Further still, cell manufacturing complexity is increased and manufacturing speed is decreased, requiring additional functions to accomplish the coating removal, tab welding and taping operations, and demands a greater financial investment to start up production. In the case of blind through welding at the foil edges, deposition of loose metal particles liberated during welding process into sensitive areas of the wound electrochemical storage cell (e.g., "jellyroll") assembly may increase production yield loss, and may create electrical shorts during cell use. It may also be difficult to inspect and verify the quality of the welds after they are formed. In the case of mechanical compression, electrical connection may degrade due to oxidation or passivation of the interface surfaces over time, loss of contact force due to shock and vibration, thermal expansion, and component distortion from internal pressures. Furthermore, the contact compressive force required to maintain adequate contact resistance may locally exceed the yield strength of the foils, limiting the power capability of the connection.

One approach that at least partially addresses the above issues includes an electrochemical storage cell, comprising first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges, first and second separator sheets mechanically and electrically separating the coated opposing surfaces of the first and second electrode sheets and mechanically and electrically separating the cylindrical core and the coated opposing surfaces of the first electrode sheet, and slotted cutouts from the uncoated conductive edges, the slotted cutouts angularly co-located relative to the cylindrical core upon forming the jellyroll structure.

In another embodiment, a method for an electrochemical storage cell comprises winding first and second electrode sheets around a cylindrical core to form a jellyroll structure, the first and second electrode sheets each comprising uncoated conductive edges parallel to end faces of the jellyroll structure, and coated opposing surfaces between the uncoated conductive edges, winding first and second separator sheets around the cylindrical core between the first and second electrode sheets to mechanically and electrically separate the coated opposing surfaces of the first and second electrode sheets and to mechanically and electrically separate the cylindrical core and the coated opposing surfaces, and cutting out slots from the uncoated conductive edges of the first and second electrode sheets to form slotted cutouts, the slotted cutouts angularly co-located relative to the cylindrical core upon forming the jellyroll structure.

In another embodiment a method for a cylindrical electrochemical cell comprises forming a first and second electrode, mounting the first and second electrodes on a cylindrical core, winding the first and second electrodes on the cylindrical core, and consolidating the first and second electrodes to electrically connect the first and second electrodes to first and second terminals of the electrochemical storage cell.

It will be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
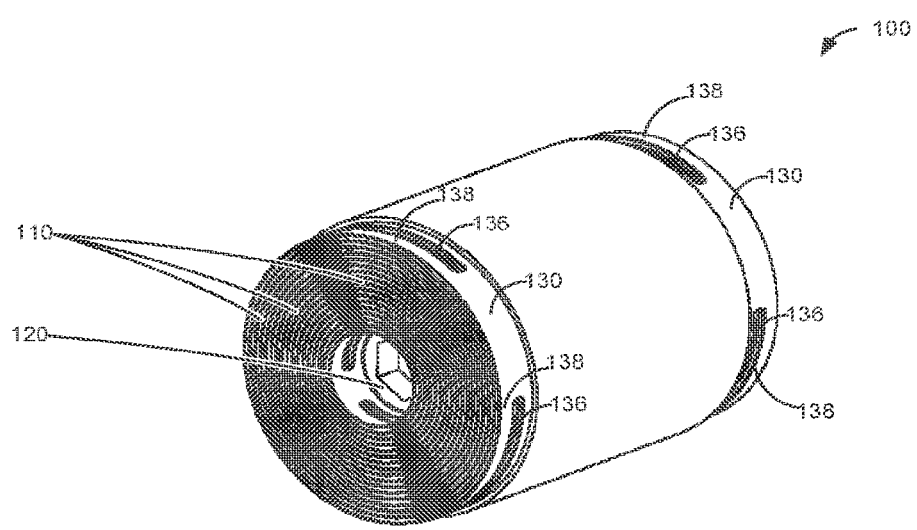
FIG. 1 schematically shows a perspective view of an electrochemical storage cell.

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that unless otherwise noted the drawing figures included in this disclosure are schematic and generally not drawn to scale. Rather, the various drawing scales, aspect ratios, and numbers of components shown in the figures may be purposely distorted to make certain features or relationships easier to see. However, FIGS. 1 and 4-12 are drawn to scale, although other relative dimensions may be used.

Figure 4A:
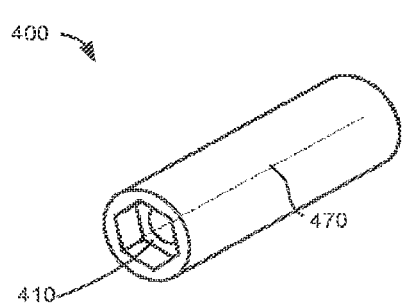
FIG. 4A schematically shows a perspective view of a winding core of an electrochemical storage cell.
Figure 4B:
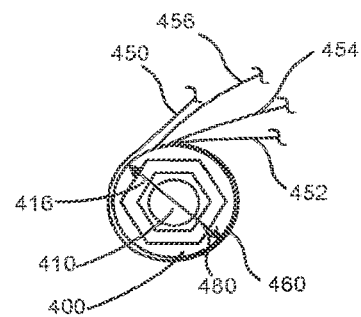
FIG. 4B schematically shows an end side view of a winding core with partially wound first and second separator sheets and partially wound first and second electrodes of an electrochemical storage cell.
Figure 5A:
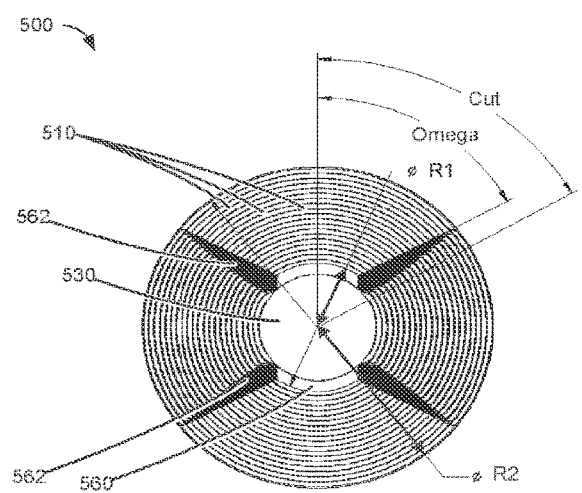
FIG. 5A schematically shows an end side view of an electrochemical storage cell.
Figure 5B:
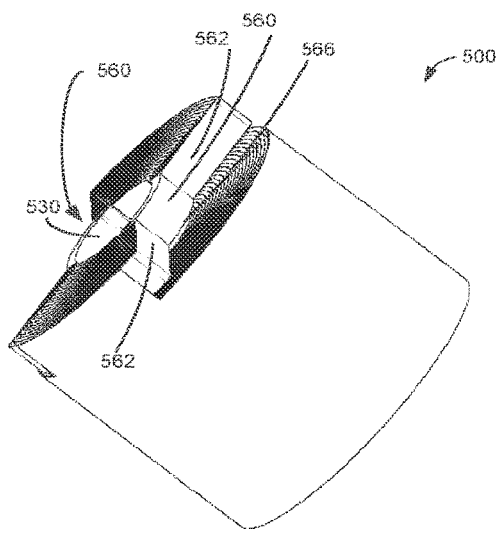
FIG. 5B schematically shows a perspective side view of an electrochemical storage cell.
Figure 10:
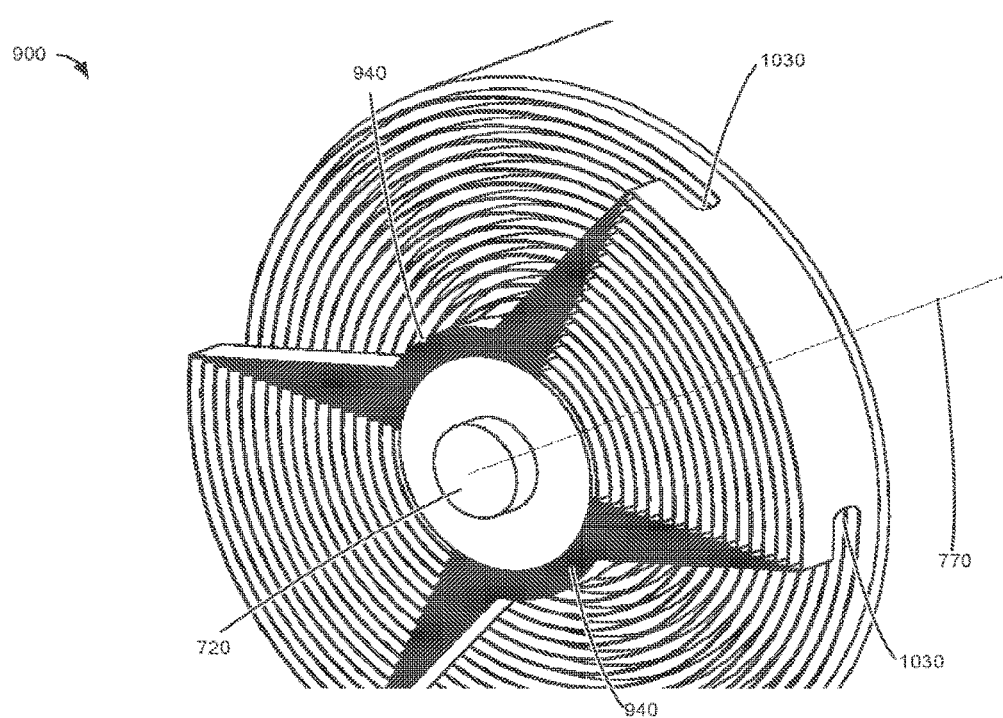
FIG. 10 schematically shows a magnified partial perspective view of an end side of an electrochemical storage cell.
Figure 11:
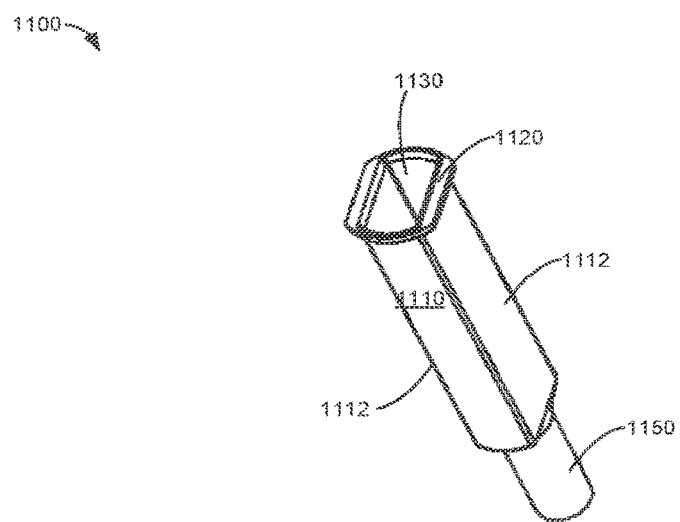
FIG. 11 schematically shows a perspective view of an alternate embodiment of a winding core for an electrochemical storage cell.
Figure 12:
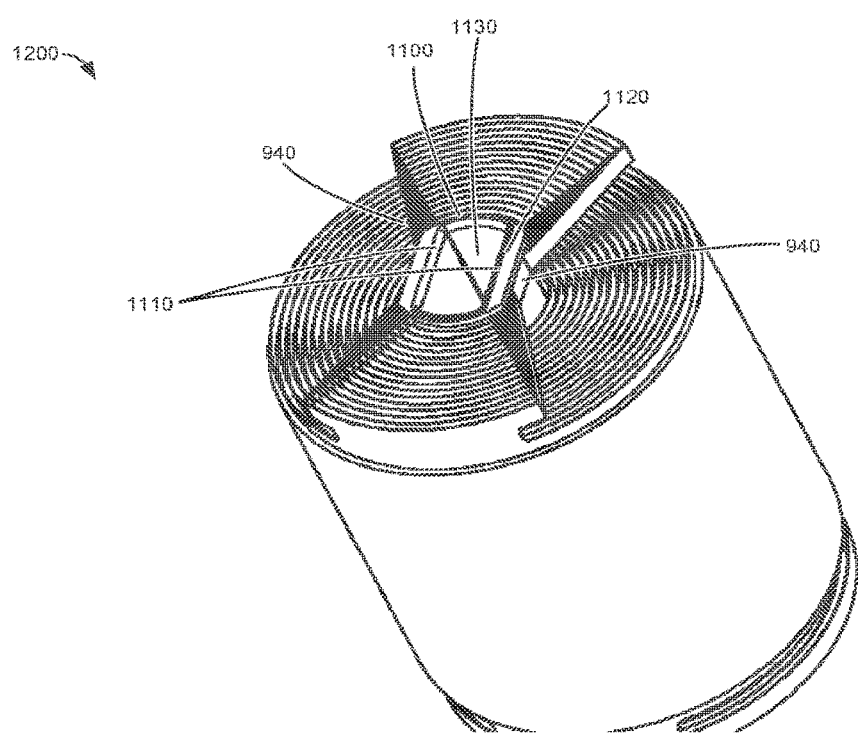
FIG. 12 schematically shows a perspective view of an alternate embodiment of an electrochemical storage cell.
Figure 13:
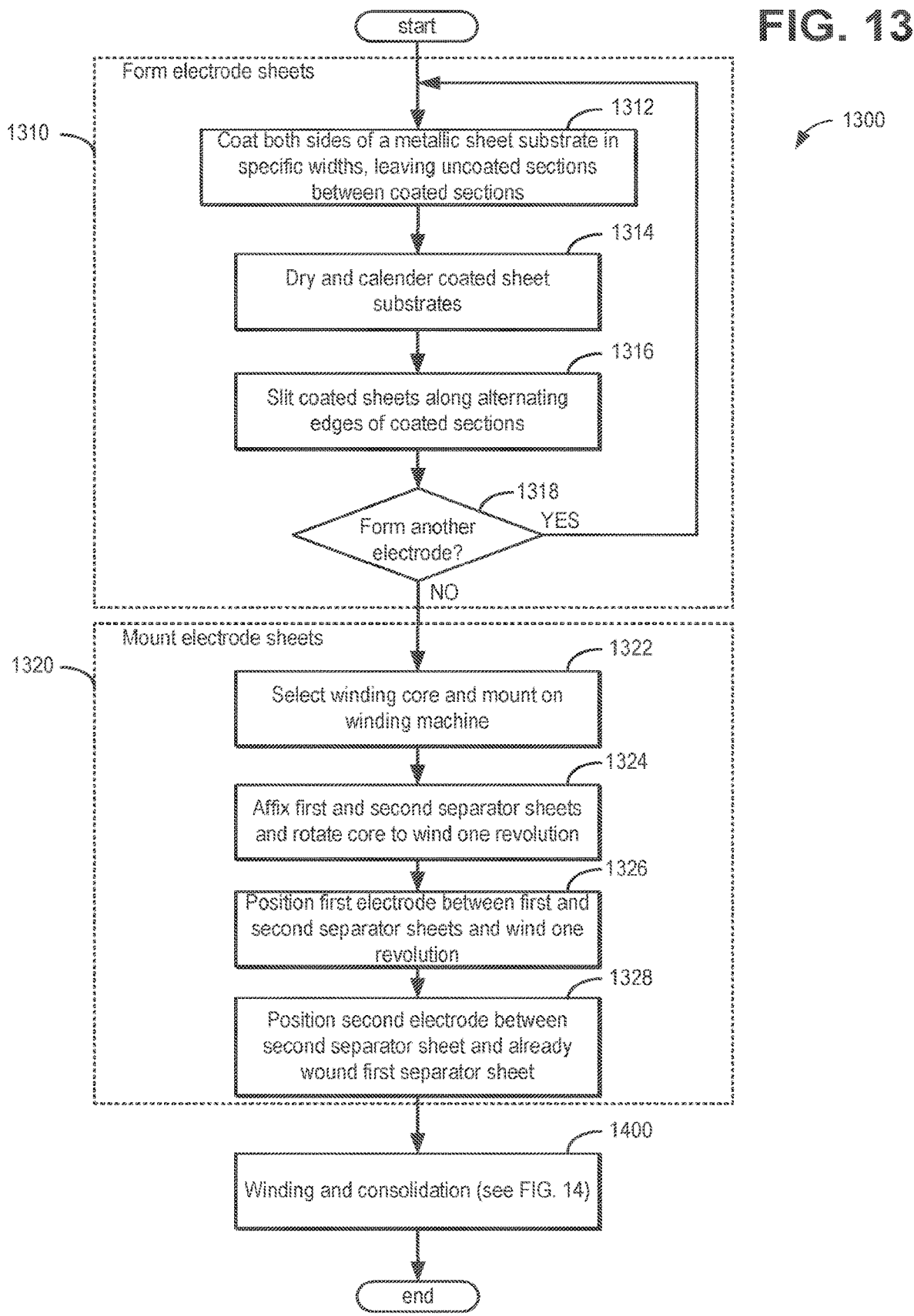
FIGS. 13-14 illustrate flow charts for an example method of assembling an electrochemical storage cell.
Figure 14:
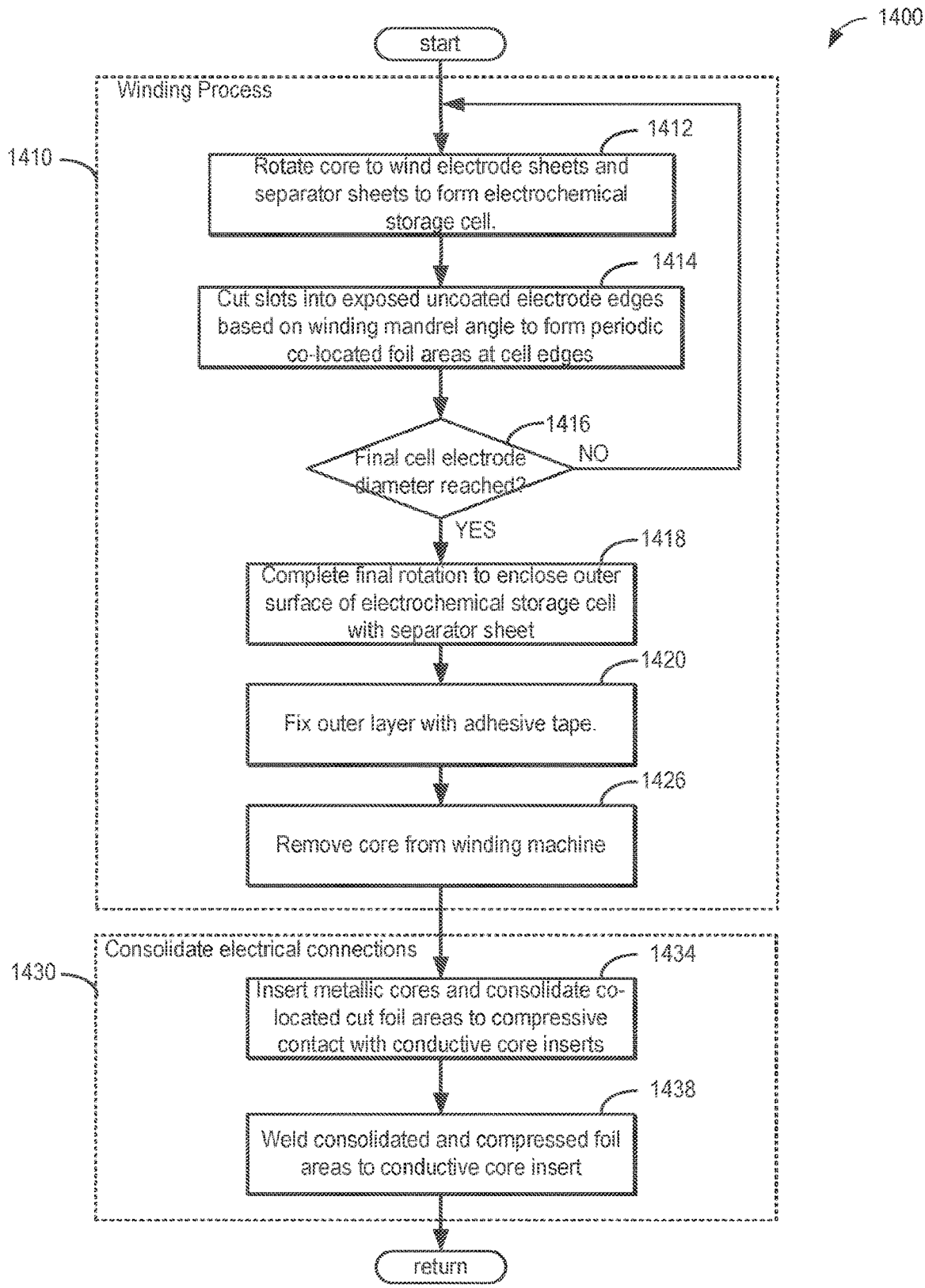

The present description relates to a cylindrical electrochemical storage cell and a fabrication method thereof providing equivalent or improved electrical and thermal performance and reduced manufacturing costs as compared with conventional cylindrical electrochemical storage cells and conventional fabrication methods thereof. An example embodiment of an electrochemical storage cell is illustrated in FIG. 1. FIGS. 2A, 2B, 3A, and 3B illustrate steps in forming the first and second electrode sheet layers. An example cylindrical winding core of an electrochemical storage cell is depicted in FIG. 4A, and an end side view of an example cylindrical winding core with partially wound first and second separator sheets and partially wound first and second electrodes of an electrochemical storage cell is shown in FIG. 4B. FIGS. 5A and 5B schematically show an end side view of an electrochemical storage cell and a perspective side view, respectively, of an electrochemical storage cell after a cut foil consolidation step. FIGS. 6A, 6B, and 7-9 schematically show perspective views of an electrochemical storage cell after various steps for assembling the electrochemical storage cell have been performed. FIG. 10 schematically shows a magnified partial perspective view of an end side of an electrochemical storage cell. FIG. 11 schematically shows a perspective view of an alternate embodiment of a winding core for an electrochemical storage cell. FIG. 12 schematically shows a perspective view of an alternate embodiment of an electrochemical storage cell. FIGS. 13-14 illustrate flow charts for an example method of assembling an electrochemical storage cell.

Several conventional methods of discrete tab attachment are currently employed in the manufacture of electrochemical storage cells, electrochemical capacitors, electrolytic capacitors, dry film capacitors and similar electrical devices. Electrode coating is interrupted or removed across the width of the electrode on both sides, exposing the underlying metallic substrate foil. A tab is then welded to this area of exposed foil. An insulating cover layer, such as adhesive tape is then applied over the welded tab area and the exposed foil on the opposite side of the electrode. Electrode coating is removed on both sides from a small rectangular area near the edge of the electrode, exposing the underlying foil on both sides. A tab is welded to the exposed foil in the previously cleared rectangular area. Insulating tape or similar is applied to both sides of the tab welding area. Electrodes are coated with a coating free edge zone area of exposed foil which is free of coating on both sides. Tabs are welded to this exposed foil area and may be insulated with tape to prevent electrical shorting at the tab sharp edges. Electrodes are coated with a wide coating free edge zone area of exposed foil which is free of coating on both sides, the width of the coating free zone being equal to the longest tab required for cell assembly. Discrete Tabs are cut from this exposed edge foil via laser cutting, water jet cutting or mechanical punching.

Electrical connection to the wound electrode assembly without the use of discrete tabs is currently accomplished by several methods. Blind through welding of coating free electrode edge foils to a flat plate or a plate with raised areas to increase the physical contact between foil edges and welding plate, the plate being held in compression against the exposed uncoated electrode foil edges. The foil edges may also be bent to form a 90 deg angle with respect to the main body of the foil sheet in order to increase the potential area for welding and current carrying cross sectional area. Maintaining a compressive force between a flat plate with or without raised ridge areas, utilizing compression to maintain a low contact resistance between the flat plate and the exposed foil edges. The foil edges may also be bent to form a 90 deg angle with respect to the main body of the foil sheet in order to increase the potential area for welding and current carrying cross sectional area.

Use of discrete tabs may be disadvantageous in that electrical current is channeled to a small area of the tabs at discrete points along the electrode, creating areas that may operate at significantly higher temperature than the remainder of the electrode due to high localized ohmic heating, especially when the cell is under heavy electrical load. Furthermore, cell Ah capacity is reduced overall due to areas of coating removal required to attach tabs. Localized differences in the electrode (e.g., anode to cathode) capacity ratio in the exposed areas may cause areas of lithium plating in the case of the Li-ion battery cell chemistry. Furthermore, the width of integral discrete tabs cut from uncoated electrode edge foil may be quite wide, reducing the efficiency of the coating and calendaring processes and thus increasing cell manufacturing cost. Further still, cell manufacturing equipment is more complex, requiring additional functions to accomplish the coating removal, tab welding and taping operations, and demands a greater financial investment to start up production. Further still, the cell manufacturing process speed is reduced in order to accomplish the coating removal, tab welding and tab taping operations, thus increasing the cell manufactured cost.

Disadvantages associated with blind through welding to foil edges include increased production yield loss due to deposition and liberation of loose metal particles during the welding process into sensitive areas of the "jellyroll" electrochemical storage cell assembly. These loose metal particles may, during the life of the electrochemical storage cell, create electrical shorts by making contact with both electrodes. Furthermore, depending on the metal type used in the foils and collector plate, a loose particle may corrode or dissolve on the electrochemical environment of the cell and then re-deposit thereon, forming a dendritic deposition and creating an internal short after some time. It may also be difficult to inspect and verify the quality of the welds, thereby increasing a manufacturing defect rate.

Disadvantages associated with mechanical compression include the contact resistance increasing over time due to oxidation or passivation of the interface surfaces. Furthermore, loss of contact force or pressure due to displacement of the foils may occur under the action of shock and vibration endured by the electrochemical storage cell during its use. Further still, the contact compressive force required to maintain adequate contact resistance may locally exceed the yield strength of the foils, thereby limiting the power capability of the connection. Further still, the contact resistance may increase due to thermal expansion coefficients and component distortion from internal pressure.

Turning now to FIG. 1, it illustrates an example of an electrochemical storage cell 100, having a spiral wound cylindrical architecture (e.g., jellyroll structure) which provides equivalent or improved electrical and thermal performance and reduced manufacturing cost over conventional methods and conventional electrochemical storage cells. The jellyroll electrochemical cell structure may comprise coated first and second electrode sheets and first and second separator sheets (generally depicted as 110 in FIG. 1) wound around a cylindrical core 120 to form a low electrical resistance connection to the housing terminals without welded discrete tabs to the individual electrodes. As shown in FIG. 1, cylindrical core 120 may have a keyed center, such as a hexagonal center which may help to facilitate mounting and dismounting the cylindrical core to a winding mandrel and may help in rotating the core during winding, as will be described further below. Electrochemical storage cell 100 also comprises exposed foil edges 130 at both axial ends of the cell, in which slotted cutouts 136 may be formed, the slotted cutouts 136 extending (and forming openings) radially through the wound electrode sheet layers in the jellyroll structure from the outer radial surface of the spiral wound cell jellyroll structure to the surface of the cylindrical core. In one example, as shown in FIG. 1, the electrochemical storage cell 100 may comprise two groups of co-located slotted cutouts 136. The groups of co-located slotted cutouts 136 may be corresponding groups in that each slotted cutout in each group may comprise the same angular arc length along each wound electrode layer in the jellyroll structure. Furthermore, the pairs of groups of the co-located slotted cutouts 136 may be formed approximately diametrically, for example within a few degrees of being exactly diametrically opposite, or exactly diametrically opposite to one another about the core 120. Furthermore, the groups of cutouts 136 at either axial end of the electrochemical storage cell 100 may be angularly aligned, as shown in FIG. 1. The groups of cutouts 136 may be cut in a specific pattern relating to the winding angle of rotation, creating a series of co-located foil areas 138. Note that the cutout shape may be a notch or other such shape, and is not necessarily limited to features that are formed by physically cutting out material.

Figure 2A:
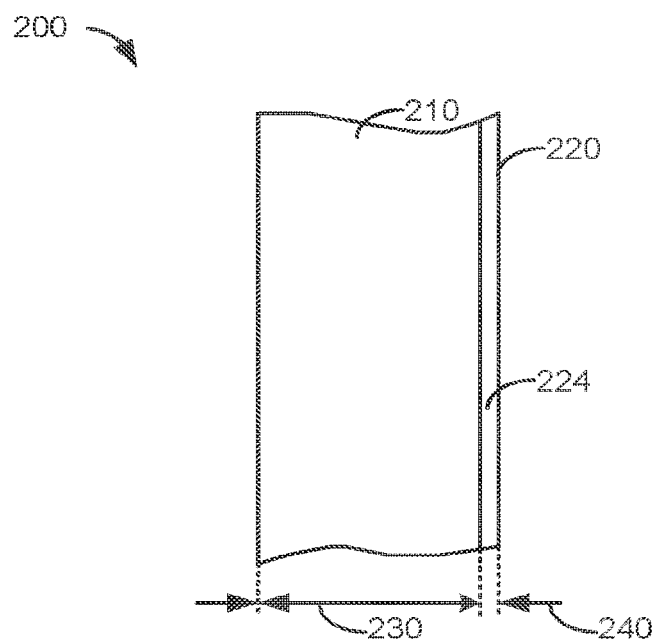
FIGS. 2A, 2B schematically show a plan view and a perspective view of a coated electrode for an electrochemical storage cell, respectively.
Figure 2B:
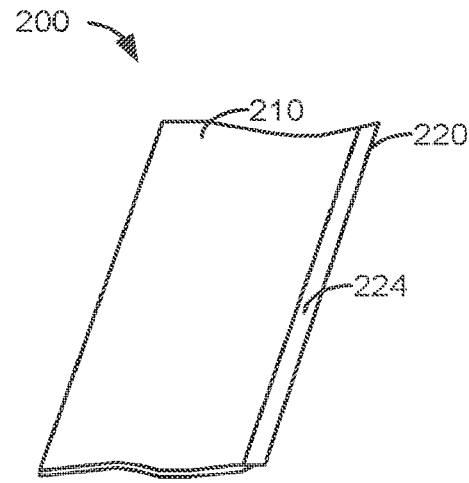

Turning now to FIGS. 2A and 2B, they illustrate a step in a method for forming a first electrode sheet 200. In one example, the first electrode may comprise an anode. However, the first electrode may instead comprise a cathode, a positive electrode, or a negative electrode. In the case of an anode for a lithium-ion electrochemical storage cell, the first electrode may comprise an electro-active lithium intercalation material or metallic lithium coating that is coated onto both sides of a metallic foil substrate in a continuous coating process. The coating may be applied in specific widths 230, leaving uncoated edge sections 224 of foil between the coated sections. After application of the coating, the electrode with coated surfaces may be dried and calendered. The coated sheet material may then be slit along alternating edges 220 of the coated sections, resulting in a continuous electrode material with exposed uncoated edge sections 224 of foil extending a specific width 230 from the coated area 210 on one edge of the electrode sheet 200. First electrode sheet 200 also includes a width 240 of the uncoated edge sections 224 of foil.

Figure 3A:
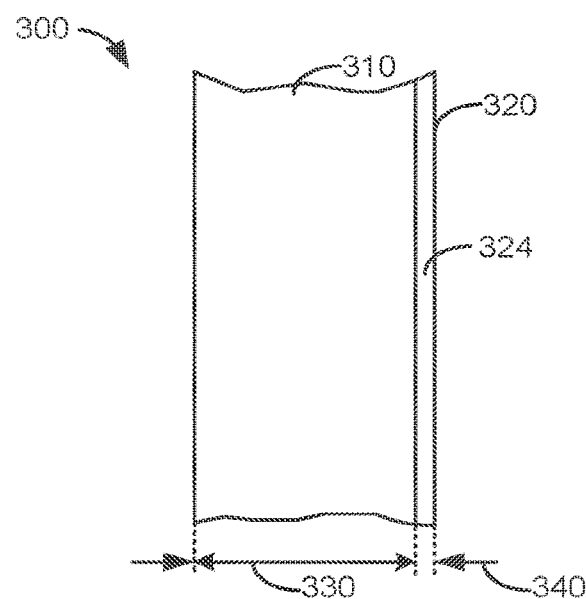
FIGS. 3A, 3B schematically show a plan view and a perspective view of a coated electrode for an electrochemical storage cell, respectively.
Figure 3B:
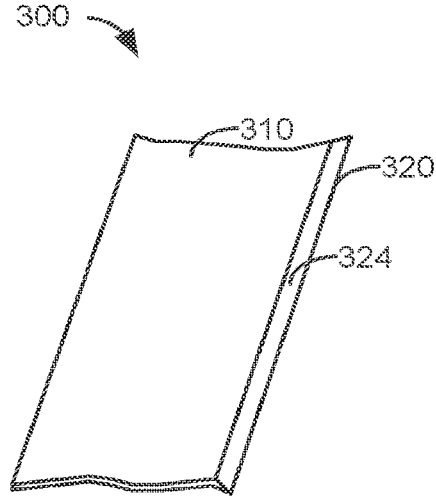

Turning now to FIGS. 3A and 3B, they illustrate a step in a method for forming a second electrode sheet 300. In one example, the second electrode may comprise a cathode. However, the second electrode may instead comprise an anode, a positive electrode, or a negative electrode. In the case of a cathode for a lithium-ion electrochemical storage cell, the second electrode may comprise a mixture of a specially prepared lithiated iron-phosphate powder, a conductive carbon, and polymeric binder. The mixture may be coated onto both sides of a metallic foil substrate in a continuous coating process to form the second electrode 300. The coating may be applied in specific widths 330, leaving uncoated edge sections 324 of foil between the coated sections. After application of the coating, the electrode with coated surfaces may be dried and calendered. The coated sheet material may then be slit along alternating edges 320 of the coated sections, resulting in a continuous electrode material with exposed uncoated edge sections 324 of foil extending a specific width 330 from the coated area 310 on one edge of the electrode 300. Second electrode sheet 300 also includes a width 340 of the uncoated edge sections 324 of foil.

Turning now to FIG. 4A, it illustrates an example of a cylindrical winding core 400 of an electrochemical storage cell. Cylindrical winding core 400 may comprise a hollow central core 410 along a cylindrical winding axis 470. The ends of the cylindrical winding core 400 may be keyed, for example hex-keyed, as illustrated in FIG. 4A to facilitate winding, mounting and dismounting the cylindrical winding core on a winding apparatus, and to mount core inserts as will be further described below. A length of the cylindrical winding core may be less than a width of the first and second electrode sheets so that the edges of the electrode sheets protrude beyond the ends of the cylindrical winding core 400, as shown in FIG. 1. The cylindrical winding core 400 may comprise a metal or plastic.

Turning now to FIG. 4B, it illustrates an end view of a cylindrical winding core 400 with partially wound electrode sheets and separator sheets. As described above, the cylindrical winding core 400 may comprise a hollow central core 410 and may also comprise keyed ends 416. As illustrated in FIG. 4B, a first separator sheet 450, a first electrode sheet 452, a second separator sheet 454, and a second electrode sheet 456 may be wound, in that order, around the cylindrical winding core 400. Partially wound layers 460 of the electrode sheet and separator sheets form a wound diameter 480 of the cell. First and second separator sheets 450, 454 may comprise non-conductive porous materials such as olefin polymers, fluoropolymers, glass fibers, ceramic fibers, cellulosic materials, and combinations thereof, such as for example ceramic coated polymer, ceramic filled polymer and glass filled polymer.

To assemble the cell jellyroll structure, a hollow plastic or metallic cylindrical winding core 400 may be placed or mounted on the shaft of a winding machine. Widthwise edges of first and second separator sheets 450 and 454 may be centered along an axial length of the core, and fixed to the core using adhesive tape. The cylindrical winding core 400 may then be rotated at least one revolution. The first electrode widthwise edge may be positioned parallel to the cylindrical winding core axis 470 between the first and second separator sheets. The winding core may then be rotated one revolution, thereby trapping and fixing the first electrode sheet 452 between the first and second separator sheets 450, 454. Next, the second electrode sheet 456 may be positioned parallel to the cylindrical winding core axis 470 between the second separator sheet 454 and the already wound on the core, first separator sheet 450. The cylindrical winding core may then be rotated continuously until the desired lengths of the first and second electrode sheets has been wound into the jellyroll configuration, and/or the desired overall wound diameter 480 is achieved. FIG. 4B further illustrates the first and second separator sheets, 450 and 454 respectively, and the first and second electrode sheets, 452 and 456 respectively, wound in layers around the cylindrical winding core 400.

The widths of the first and second electrodes may both be greater than widths of the first and second separator sheets, but may both comprise coated widths which are less than or equal to the width of the first and second separator sheets. Furthermore, the second electrode may comprise a coated width that may be slightly narrower than the coated width of the first electrode. In this way, the separator sheets may mechanically and electrically separate the coated surfaces of the first and second electrodes wound about the cylindrical winding core. Furthermore, in the case of the first electrode being the negative electrode and the second electrode being the positive electrode, having the coated width of the second electrode narrower than the coated width of the first electrode may avoid deposition of metallic lithium on the exposed slit edge as well as the exposed metal foil substrate of the first electrode. Deposition of metallic lithium may reduce the amount of usable stored electrical energy as well as increase the risk of degradation and durability of the electrochemical cell when subjected to thermal, electrical and/or mechanical stress.

During the winding process, narrow slotted cutouts 136 may be cut into the exposed electrode foil edges 130, in a specific pattern relating to the winding angle of rotation, creating a series of co-located foil areas 138 mechanically free to be later deformed toward the central core in a consolidating step and consolidated for welding. The consolidation and welding step may serve to electrically connect the wound layers of the first electrode sheet to each other, to electrically connect the wound layers of the second electrode sheet to each other, and to electrically connect the wound layers of the first electrode sheet and the second electrode sheet to terminals of the electrochemical storage cell formed by conductive core inserts 710, 720.

The slot cutting process may be performed based on the winding mandrel rotation angle. In this way, the slots in each layer may be radially aligned and angularly co-located such that the slots in succeeding layers of the first and second electrodes form an opening in the jellyroll structure that extends from the outer surface of the cell through to the outer surface of the cylindrical winding core.

The length of the cut slot may be controlled to create a free arc length that covers an included angle in each layer of the electrode material in the jellyroll structure from 45° (π/4 radians) to greater than or equal to 115° (approx 2 radians) but less than 180° (e.g., less than π radians). The preferred arc length of the cut may be dependent upon the radial distance from the outside diameter of the jellyroll to the core surface, and may be dependent upon the shape of the core surface being convex, concave, or flat. The cut slot arc length and angular position thereof may be controlled based on the total winding mandrel rotation angle or controlled based on one or more of winding angle, material thickness, and winding diameter (or radius) of the jellyroll structure.

Figure 6A:
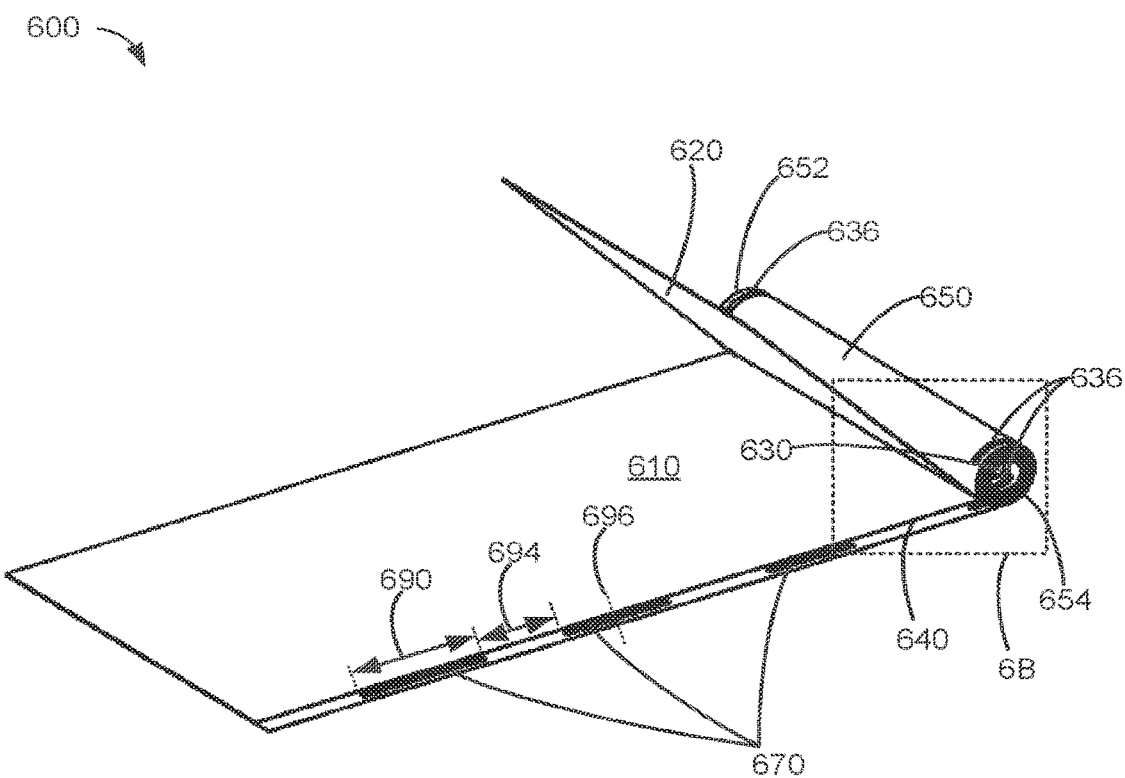
FIGS. 6A and 6B schematically show perspective views of a step for assembling an electrochemical storage cell.
Figure 6B:
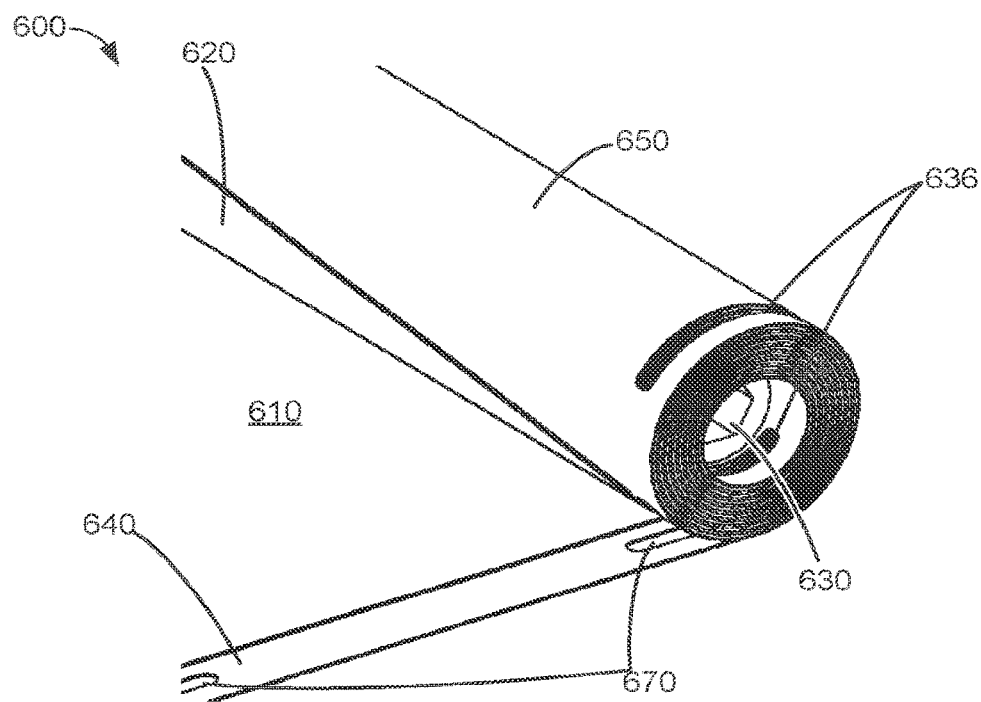

Turning now to FIGS. 6A and 6B, they illustrate perspective views of a partially assembled electrochemical storage cell 600 during winding of the first and second electrode sheets and first and second separator sheets onto a cylindrical winding core 630. FIG. 6B is an enlarged perspective view of the partially assembled electrochemical storage cell 600 of a region 6B in FIG. 6A. The partially assembled electrochemical storage cell 600 includes a coated width 610 of an electrode sheet (e.g., a first electrode sheet or a second electrode sheet), an uncoated edge section 640 of the electrode sheet, and a separator sheet 620 (e.g., first or second separator sheet) wound to form a partial jellyroll structure 650. Although not explicitly shown in FIGS. 6A and 6B, the partially assembled electrochemical storage cell 600 may include both first and second electrode sheets and both first and second separator sheets partially wound to form partial jellyroll structure 650. The coated width 610 may be less than or equal to the width of the separator sheet 620 to ensure that the separator sheet 620 both electrically and mechanically separates the first electrode sheet from the second electrode sheet.

The uncoated edge sections 640 may comprise a plurality of slotted cutouts 670. The slotted cutouts may be formed prior to winding or as the electrode sheet is wound onto the cylindrical winding core 630. As shown in FIG. 6B, a shape of the slotted cutouts 670 is generally ovular, long, and narrow. Furthermore, a length 690 of the slotted cutouts increases (and a spacing 694 between slotted cutouts decreases) as a length of electrode sheet wound onto the cylindrical core increases so that upon winding the electrode sheet on the cylindrical winding core 630, the slotted cutouts 670 may be angularly co-located relative to the cylindrical winding core 630. As described above, the length of the slotted cutouts may correspond to an arc length covering an included angle equal to or greater than 45 degrees, but less than 180 degrees, upon winding the electrode sheet on the cylindrical winding core 630. Furthermore, the lengthwise centerlines 696 of successive slotted cutouts 670 may be spaced so that they are opposed 180° when wound on the cylindrical winding core 630, and form openings 636 in the jellyroll structure that extend radially from the outer surface of the electrochemical storage cell through to the outer surface of the cylindrical winding core 630.

The slot cutting process can be performed by logic controlled laser cutting, high-pressure water jet cutting, mechanical die cutting or by other commonly known industrial cutting or punching processes. The winding process is continued until a final length of the first and second electrode sheets is wound, and/or a final winding diameter is wound. The jellyroll may then be rotated one or more additional revolutions to cover the outer layer of the jellyroll structure in its entirety with the first and/or second separator sheets, and the outer layer of the jellyroll may be fixed with one or more layers of adhesive tape. The tape may have the same width or be slightly wider than the first and/or second separator sheets. The resulting jellyroll assembly and winding core is removed from the winding machine mandrel.

Figure 7:
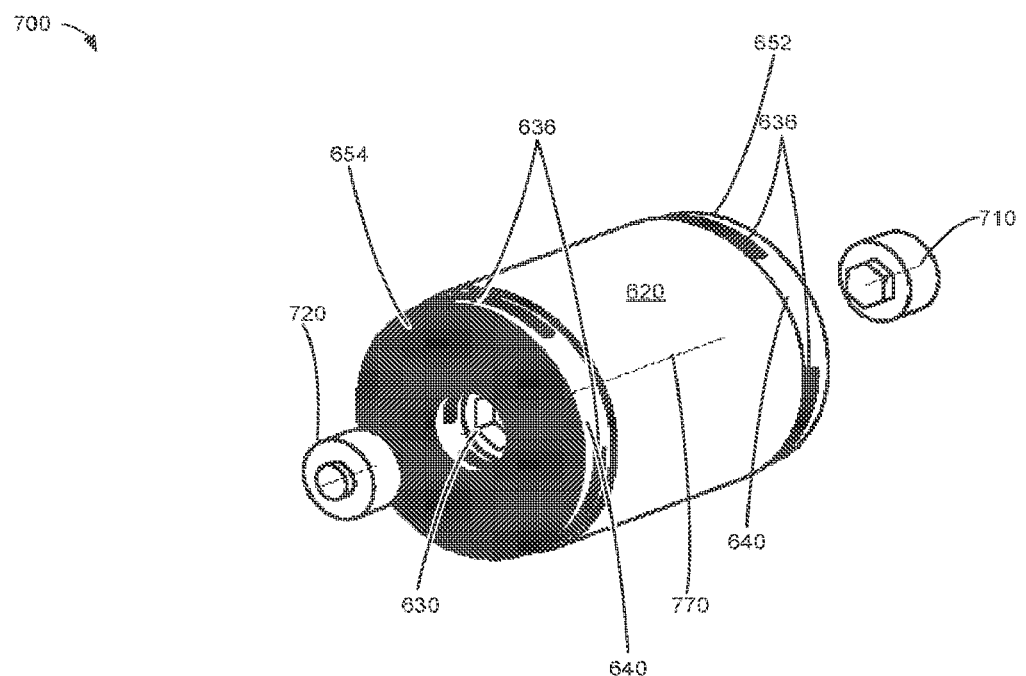
FIGS. 7-9 schematically show perspective views of steps for assembling an electrochemical storage cell.
Figure 8:
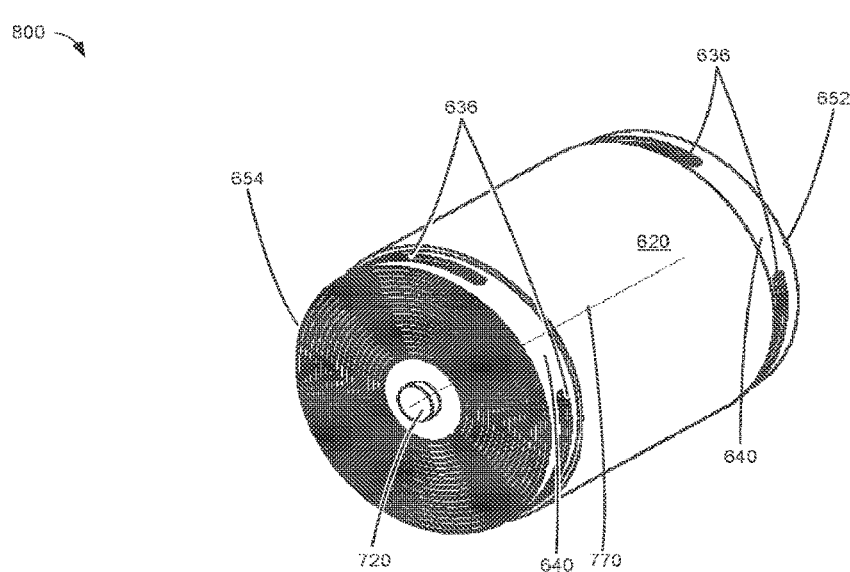

Turning now to FIG. 7, it illustrates a fully wound jellyroll structure 700 of an electrochemical storage cell. A central portion of the outer surface of the jellyroll structure may comprise an insulative separator sheet 620, with adjacent edge sections 640, comprising openings 636 formed from angularly co-located slotted cutouts 670, exposed at either end 652, 654 of the jellyroll. Conductive core inserts 710 and 720 may be aligned with the axis 770 and inserted at ends 654 and 652, respectively, of the cylindrical winding core 630. In this way, conductive core inserts 710 and 720 may form positive and negative (or negative and positive) terminals of the electrochemical storage cell. FIG. 8 illustrates a fully wound jellyroll structure 700 of an electrochemical storage cell, including inserted conductive core inserts 710 and 720 (710 not shown).

Figure 9:
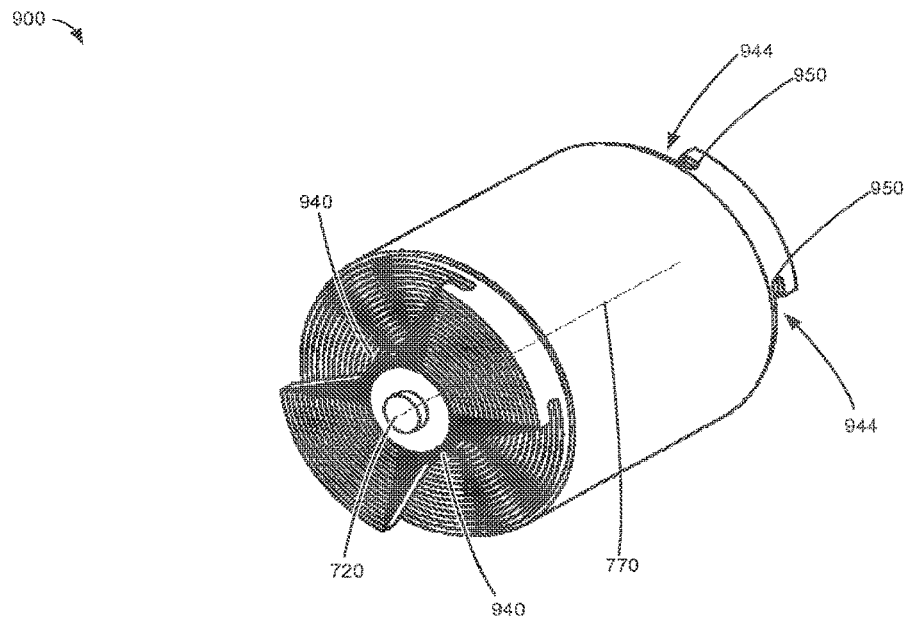

Turning now to FIG. 9, portions 940, 944 of the exposed foil edge sections 640 adjacent to the slotted cutouts 670 of the wound layers of the first second electrode sheets may be consolidated, compressing them in a central region to be in compressive and electrical contact with the surface of the conductive core inserts 710 and 720 on both sides of the jelly roll. In one example, the compression may be carried out by mounting the jellyroll structure in a fixture with one or more movable dies, the dies shaped to correspond to the length of the portions of the exposed foil edge sections 640 adjacent to the angularly co-located slotted cutouts 670. The compressed portions 940, 944 may be welded by appropriate means to the sides of the central core insert, thereby creating a low resistance electrical and thermal connection of the first and second electrodes to the metallic core. The welding may be performed by ultrasonic vibration welding, electrical resistance welding, or by fusion welding such a laser or electron beam welding.

The shape of the slotted cutouts 670 may be modified to achieve various characteristics. For example, the slotted cutouts 670 may include a large circular (e.g., curved, rounded) end sections 950 in order to reduce stresses on the foil edges at said end sections and to reduce a risk of tearing of the electrode sheets, including reducing a risk of tearing of the electrode sheets during compressing and deforming the portions of the electrode sheets adjacent to the slotted cutouts 670 when electrically connecting the electrode sheets to the conductive core inserts. As another example, a width of the slotted cutouts 670 may be reduced to decrease the ohmic resistance of the uncoated foil layers (e.g., uncoated edge sections 640) when the electrode sheet is wound onto the cylindrical winding core 630. Furthermore, a width of the slotted cutouts 670 may be less than a width of the uncoated edge sections 640 so that after consolidation and/or compression of the portions 940, 944, a gap space 1030, comprising the width of the slotted cutouts 670, may be formed between the compressed portions 940, 944 and the main body of the jellyroll structure, as illustrated in FIG. 10.

As shown in FIG. 6B, the uncoated edge section 640, including the slotted cutouts 670, may axially protrude beyond the cylindrical winding core 630 when wound to form the jellyroll structure. An axial length of the cylindrical winding core 630 may be less than a width of the first and second electrode sheets so that the uncoated edge sections 640 of the electrode sheets protrude beyond the ends of the cylindrical winding core 630. In this way, portions of the electrode sheets adjacent to the slotted cutouts 670 may be deformed and compressed towards the cylindrical winding core 630 to electrically connect the first and second electrode sheets with the conductive core inserts at first and second ends 652, 654 of the jellyroll structure. Furthermore, uncoated edge sections of the first and second electrode sheets may protrude beyond the ends of the cylindrical winding core at first and second ends 652, 654, respectively to electrically connect a first electrode sheet to a first conductive core insert and a second electrode sheet to a second conductive core insert. In this way, a first electrode sheet may be electrically connected to a first terminal of the electrochemical storage cell, and a second electrode sheet may be electrically connected to a second terminal of the electrochemical storage cell.

Turning now to FIGS. 5A and 5B, they illustrate an end side view and a perspective side view of a jellyroll structure 500 of an electrochemical storage cell after electrode sheets 510 and separator sheets have been fully wound on a cylindrical winding core 530 and after portions 560 of the uncoated edge sections adjacent to the slotted cutouts have been compressed to the surface of the cylindrical winding core 530. FIGS. 5A and 5B also show sides 562 of the portions 560 which comprise densified compressed layers of the uncoated edge sections of the electrode sheets. The cylindrical winding core comprises a radius R1 and the jellyroll structure has a wound electrode sheet radius R2. Accordingly, the wound electrode sheets and the wound separator sheets form layers in the jellyroll structure between a radius R1 and a radius R2. An arc length of any portion of the layers may be computed by the product of the angular distance, omega ($\Omega$) and the radius, R. Thus an arc length at the surface of the cylindrical core may be expressed as $\Omega R1$, and an arc length at the surface of the wound jellyroll structure 500 may be expressed as $\Omega R2$. In this way, a length of the slotted cutouts and a spacing between the slotted cutouts may be predetermined according to the cylindrical core radius, a thickness of the electrode sheets and the separator sheets, and a length of the electrode sheets and the separator sheets to be wound (or a final radius of the wound jellyroll structure).

Turning now to FIG. 11, it illustrates an alternative embodiment 1100 including the cylindrical winding core 1150 and conductive core insert 1110 having flattened faces 1112 and a flattened ovular cross-section 1130. In this way, the conductive core inserts may be modified such that the welding areas are flat rather than curved, simplifying foil-core weld tooling design and the welding process. The flattened welding surfaces may be especially advantageous for the case of ultrasonic vibration welding. Furthermore, the flattened faces 1112 may provide for increased compressive force and increased electrical connection when consolidating and compressing the portions 940 to electrically connect the first electrode sheet and the second electrode sheet to the conductive core inserts. The ends of the conductive core insert 1110 may also include a lip 1120. FIG. 12 illustrates the wound jellyroll structure 1200 including a conductive core insert with flattened faces 1112, and a cylindrical winding core 1150. As shown in FIG. 12, the lip 1120 may extend over and cover a portion of the compressed/consolidated portions 940, mechanically protecting them and also increasing a surface area for electrical connection with the electrode sheets (e.g., after welding).

The assembled and welded jellyroll structure 1200 may be inserted into a cylindrical cell housing. Electrical connection to the cylindrical cell housing from the core insert may be accomplished by through welding to an insulated housing terminal at one polarity terminal and by through welding to the housing on the opposite end to connect the terminal of the second polarity. Alternatively, tabs may be welded between the core inserts and the housing terminals prior to housing closure.

In this manner, an electrochemical storage cell may comprise first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges, first and second separator sheets mechanically and electrically separating the coated opposing surfaces of the first and second electrode sheets and mechanically and electrically separating the cylindrical core and the coated opposing surfaces of the first electrode sheet, and slotted cutouts from the uncoated conductive edges, the slotted cutouts angularly co-located relative to the cylindrical core upon forming the jellyroll structure. The electrochemical storage cell may further comprise compressed angularly co-located portions of the uncoated conductive edges, wherein the compressed angularly co-located portions are electrically connected to each other, and the compressed angularly co-located portions are adjacent to the slotted cutouts. The cylindrical core may comprise a pair of flat opposing sides, the pair of flat opposing sides forming a flattened ovular cross-section, and the compressed angularly co-located portions may be electrically connected to the cylindrical core at the flattened opposing sides. A length of the slotted cutouts forms an arc length corresponding to an angle less than 180° upon forming the jellyroll structure, and a length of the slotted cutouts may form an arc length corresponding to an angle greater than 2 radians upon forming the jellyroll structure. Furthermore, lengthwise ends of the slotted cutout may comprise a rounded shape, and the slotted cutouts may comprise a first and second group of slotted cutouts, wherein the first and second group of slotted cutouts is angularly opposed at 180° relative to the cylindrical core.

The electrochemical cell may further comprise first and second conductive core inserts, the first and second conductive core inserts inserted into the ends of the cylindrical core to form terminals of the electrochemical storage cell, the first conductive core insert electrically connected to the compressed angularly co-located portions of the uncoated conductive edges of the first electrode and the second conductive core insert electrically connected to the compressed angularly co-located portions of the uncoated conductive edges of the second electrode. A width of the first and second electrodes parallel to an axis of the cylindrical core may be greater than a width of the first and second separators parallel to an axis of the cylindrical core. A width of the coated opposing surfaces may be less than or equal to the width of the first and second separators, and a width of the coated opposing surfaces of the second electrode may be less than a width of the coated opposing surfaces of the first electrode.

Turning now to FIG. 13, it illustrates an example method 1300 for an electrochemical storage cell. Method 1300 begins by forming the electrode sheets at 1310. Forming the electrode sheets may comprise coating both sides of a metallic sheet substrate at 1312 in specific widths, leaving uncoated sections between the coated sections of the specific widths. At 1314 method 1300 may dry and calendar the coated sheet substrates to cure and/or smooth and level the coated substrates. Next, method 1300 may slit the coated sheets along alternating edges of the coated sections, thereby forming the electrodes. The composition of the coating may depend on the nature of the electrode. For example, an anode for a lithium-ion electrochemical storage cell may comprise an electro-active lithium intercalation material or metallic lithium coating coated onto both sides of a metallic foil substrate in a continuous coating process. As another example, a cathode for a lithium-ion electrochemical storage cell may comprise a mixture of lithiated iron-phosphate powder, conductive carbon and polymeric binder. Method 1300 may also be used for other types of electrochemical storage cells and is not limited to lithium-ion electrochemical storage cells.

Continuing at 1318, method 1300 determines if another electrode is to be formed. If another electrode is to be formed, method 1300 returns to 1312; otherwise method 1300 continues at 1320, where the electrode sheets are mounted. At 1322, method 1322 selects a winding core and mounts the winding core on a winding machine. As an example, a winding core may comprise a hollow cylindrical winding core, such as the cylindrical winding core 530 with a circular cross section. Other winding cores with different cross sectional geometries may also be used. For example, a cylindrical winding core with a flattened ovular cross section 1130 may be used. An interior of the winding core may be keyed, as shown in FIGS. 4A and 4B, to facilitate mounting the winding core on a winding mandrel of a winding machine, and to facilitate winding of the winding core.

Method 1300 continues at 1324 where a first and second separator sheet are affixed to the outer curved surface of the winding core and the winding core is rotated to wind at least one revolution of the first and second separator sheets on the winding core. The widthwise edges of the first and second separator sheet may be parallel to the central axis of the cylindrical core so that successive layers of the first and second separator sheets are wound in a uniformly parallel manner around the winding core. Furthermore, the first electrode sheet may be positioned so that the uncoated edge sections of wound layers may protrude beyond a first end of the winding core.

At 1326, the first electrode sheet is positioned between unwound ends of the first and second separator sheets adjacent to the winding core, and the winding core is rotated to wind at least one revolution of the first electrode sheet on the winding core. The widthwise edge of the first electrode sheet may be positioned parallel to the central axis of the cylindrical core so that successive layers of the first electrode sheet are wound in a uniformly parallel manner around the winding core. At 1328, the second electrode sheet is positioned on the surface of the second separator sheet, and the winding core is rotated to wind at least one revolution of the second electrode sheet on the winding core. In this way the first and second separator sheets electrically and mechanically separate coated widths of the first and second electrode sheets. The widthwise edge of the second electrode sheet may be positioned parallel to the central axis of the cylindrical core so that successive layers of the second electrode sheet are wound in a uniformly parallel manner around the winding core. Furthermore, the second electrode sheet may be positioned so that the uncoated edge sections of wound layers may protrude beyond a second end of the winding core.

Turning now to FIG. 14, method 1300 continues at 1400, comprising winding and consolidating electrical connections. At 1410, the winding process is performed. As an example, winding process 1400 may be carried out on a continuous winding machine, and may be executed by a computer controller. At 1412 the winding core is rotated to continuously wind electrode sheets and separator sheets to form the jellyroll structure of the electrochemical storage cell. While the winding core is rotated, slotted cutouts may be cut from the uncoated edge sections of the electrode sheets. As described above, the length of the slotted cutouts and the spacing therebetween may be predetermined according to the cylindrical core radius, a thickness of the electrode sheets and the separator sheets, and a length of the electrode sheets and the separator sheets to be wound (or a final radius of the wound jellyroll structure). Furthermore, a length of the slotted cutouts may be based on a winding mandrel angle, and may correspond to an arc length covering an included angle equal to or greater than 2 radians (and less than 180 degrees) upon winding the electrode sheet on the cylindrical winding core 630. Furthermore, the lengthwise centerlines 696 of successive slotted cutouts 670 may be spaced so that they are opposed 180° when wound on the cylindrical winding core 630, and form openings 636 in the jellyroll structure that extend radially from the outer surface of the electrochemical storage cell through to the outer surface of the cylindrical winding core 630.

Further still, the angular winding speed may correspond to a speed of cutting of the slotted cutouts, the cutting process being performed by logic controlled laser cutting, high-pressure water jet cutting, mechanical die cutting, or other commonly known industrial cutting and/or punching processes. Method 1400 continues at 1416, where it determines if a final jellyroll structure diameter (e.g., electrochemical storage cell electrode diameter) has been reached. Alternately, at 1416, method 1400 may determine if a final length of the wound electrode sheets has been reached. If not, method 1400 returns to 1412 where the rotation of the winding core is continued.

If at 1416, the final jellyroll structure diameter has been reached, method 1400 continues at 1418 where one final rotation of the winding core is completed to enclose the outer surface of the electrochemical storage cell with one of the separator sheets. At 1420, the outer layer of the electrochemical storage cell comprising the separator sheet is fixed with adhesive tape, and at 1426, the winding core along with the wound electrochemical storage cell electrode sheets is removed from the winding machine.

Method 1400 continues at 1430 where consolidation of the electrical connections is performed. At 1434, method 1400 inserts conductive core inserts at both ends of the winding core, and the portions of the uncoated edge sections adjacent to the slotted cutouts are consolidated and compressed towards the winding core and towards the outer surface of the conductive core inserts. The portions of the uncoated edge sections adjacent to the slotted cutouts comprise the distal portions of the uncoated edge sections adjacent to the slotted cutouts relative to an axial midpoint of the electrochemical storage cell. For example, consolidation and compression forms portions 560 of consolidated and electrically connected layers of the electrode sheets along with sides 562 of the portions 560 which comprise densified compressed layers of the uncoated edge sections of the electrode sheets. At 1438, the portions (e.g., portions 560) are welded to electrically connect the consolidated electrode sheets to the surface of the conductive core inserts.

Uncoated edge sections of the first and second electrode sheets may protrude beyond the ends of the cylindrical winding core at first and second ends 652, 654, respectively to electrically connect a first electrode sheet to a first conductive core insert and a second electrode sheet to a second conductive core insert after the consolidation of electrical connections 1430 (e.g., 1434, 1438). In this way, a first electrode sheet may be electrically connected to a first terminal of the electrochemical storage cell, and a second electrode sheet may be electrically connected to a second terminal of the electrochemical storage cell. In this way, the conductive core inserts form the positive and negative terminals of the electrochemical storage cell.

The assembled and welded jellyroll structure may be inserted into a cylindrical electrochemical storage cell housing. Electrical connection from the core insert to the cell housing may be accomplished by through welding to an insulated housing terminal at one polarity terminal and to the housing on the opposite end to connect the terminal of the second polarity. Alternatively, tabs may be welded between the core inserts and the housing terminals prior to housing closure.

In this manner, a method for an electrochemical storage cell may comprise: winding first and second electrode sheets around a cylindrical core to form a jellyroll structure, the first and second electrode sheets each comprising uncoated conductive edges parallel to end faces of the jellyroll structure, and coated opposing surfaces between the uncoated conductive edges; winding first and second separator sheets around the cylindrical core between the first and second electrode sheets to mechanically and electrically separate the coated opposing surfaces of the first and second electrode sheets and to mechanically and electrically separate the cylindrical core and the coated opposing surfaces; and cutting out slots from the uncoated conductive edges of the first and second electrode sheets to form slotted cutouts, the slotted cutouts angularly co-located relative to the cylindrical core upon forming the jellyroll structure. The method may further comprise compressing angularly co-located portions of the uncoated conductive edges at end faces of the jellyroll structure to the cylindrical core to electrically connect the uncoated conductive edges to each other, the angularly co-located portions of the uncoated conductive edges being adjacent to the slotted cutouts. The method may further comprise inserting first and second conductive core inserts into each end of the cylindrical core, and compressing angularly co-located portions of the uncoated conductive edges at end faces of the jellyroll structure to the cylindrical core to electrically connect the uncoated conductive edges of the first electrode to the first conductive core insert and to electrically connect the uncoated conductive edges of the second electrode to the second conductive core insert. The method may further comprise welding the compressed angularly co-located portions of the uncoated conductive edges to the cylindrical core. The first and second electrodes may be electrically connected to the cylindrical core without welding conductive tabs to the first and second electrode.

In this manner, a method for a cylindrical electrochemical cell may comprise: forming a first and second electrode; mounting the first and second electrodes on a cylindrical core; winding the first and second electrodes on the cylindrical core; and consolidating the first and second electrodes to electrically connect the first and second electrodes to first and second terminals of the electrochemical storage cell.

Consolidating the first and second electrodes may be performed without welding conductive tabs to the first and second electrode.

As described herein, in one example an electrochemical storage cell may be provided, comprising: first and second electrode sheets wound around a cylindrical core forming a jellyroll structure, the first and second electrode sheets each comprising uncoated conductive edges parallel to end faces of the jellyroll structure, and coated opposing surfaces between the uncoated conductive edges; first and second separator sheets mechanically and electrically separating the coated opposing surfaces of the first and second electrode sheets and mechanically and electrically separating the cylindrical core and the coated opposing surfaces of the first electrode sheet; and slotted cutouts from the uncoated conductive edges, the slotted cutouts angularly co-located relative to the cylindrical core upon forming the jellyroll structure. The electrochemical storage cell may further comprise compressed angularly co-located portions of the uncoated conductive edges, wherein the compressed angularly co-located portions are electrically connected to each other, and the compressed angularly co-located portions are adjacent to the slotted cutouts. Additionally or alternatively, the cylindrical core may comprise a pair of flat opposing sides, the pair of flat opposing sides forming a flattened ovular cross-section. The compressed angularly co-located portions may be electrically connected to the cylindrical core at the flattened opposing sides. A length of the slotted cutouts may form an arc length corresponding to an angle less than 180° upon forming the jellyroll structure. A length of the slotted cutouts forms an arc length may correspond to an angle greater than 2 radians upon forming the jellyroll structure. Further, lengthwise ends of the slotted cutout may comprise a rounded shape, wherein the slotted cutouts comprise a first and second group of slotted cutouts, wherein the first and second group of slotted cutouts are angularly opposed at 180° relative to the cylindrical core.

The electrochemical cell may further comprise first and second conductive core inserts, the first and second conductive core inserts inserted into the ends of the cylindrical core to form terminals of the electrochemical storage cell, the first conductive core insert electrically connected to the compressed angularly co-located portions of the uncoated conductive edges of the first electrode and the second conductive core insert electrically connected to the compressed angularly co-located portions of the uncoated conductive edges of the second electrode. A width of the first and second electrodes parallel to an axis of the cylindrical core may be greater than a width of the first and second separators parallel to an axis of the cylindrical core. A width of the coated opposing surfaces may be less than or equal to the width of the first and second separator. A width of the coated opposing surfaces of the second electrode may be less than a width of the coated opposing surfaces of the first electrode.

In another example, a method for an electrochemical storage cell may comprise winding first and second electrode sheets around a cylindrical core to form a jellyroll structure, the first and second electrode sheets each comprising uncoated conductive edges parallel to end faces of the jellyroll structure, and coated opposing surfaces between the uncoated conductive edges; winding first and second separator sheets around the cylindrical core between the first and second electrode sheets to mechanically and electrically separate the coated opposing surfaces of the first and second electrode sheets and to mechanically and electrically separate the cylindrical core and the coated opposing surfaces; and cutting out slots from the uncoated conductive edges of the first and second electrode sheets to form slotted cutouts, the slotted cutouts angularly co-located relative to the cylindrical core upon forming the jellyroll structure.

The method may further comprise compressing angularly co-located portions of the uncoated conductive edges at end faces of the jellyroll structure to the cylindrical core to electrically connect the uncoated conductive edges to each other, the angularly co-located portions of the uncoated conductive edges being adjacent to the slotted cutouts. Additionally or alternatively, the method may further comprise inserting first and second conductive core inserts into each end of the cylindrical core, and compressing angularly co-located portions of the uncoated conductive edges at end faces of the jellyroll structure to the cylindrical core to electrically connect the uncoated conductive edges of the first electrode to the first conductive core insert and to electrically connect the uncoated conductive edges of the second electrode to the second conductive core insert. The method may further comprise welding the compressed angularly co-located portions of the uncoated conductive edges to the cylindrical core. The first and second electrodes may be electrically connected to the cylindrical core without welding conductive tabs to the first and second electrode.

In another example, a method for a cylindrical electrochemical cell, comprises: forming a first and second electrode; mounting the first and second electrodes on a cylindrical core; winding the first and second electrodes on the cylindrical core; and consolidating the first and second electrodes to electrically connect the first and second electrodes to first and second terminals of the electrochemical storage cell. Consolidating the first and second electrodes may be performed without welding conductive tabs to the first and second electrode.

The disclosed electrochemical storage cell provides several performance and manufacturing advantages as compared with conventional electrochemical storage cells. First, by cutting slots in exposed uncoated foil edge sections and by consolidating electrode foils at the inside diameter of the jelly roll winding in the plane normal to the cell central axis to electrically connect electrodes to the conductive core inserts, preparing electrodes for discrete tab welding is avoided, thereby reducing the cost of the winding process and associated equipment. Second the cell assembly part count is reduced because discrete tabs and insulating tape for the electrode sheets are not used, further reducing cost. Third cell electrical resistance is reduced, increasing efficiency of the electrochemical storage cell. Fourth, a width of uncoated foil sections may be reduced as compared to conventional manufacturing comprising welding cut tabs to electrode sheets. Fifth, manufacturing costs are reduced by enabling high speed automated assembly with winding speeds corresponding to the speed of a laser cutter for cutting slotted cutouts, instead of stopping the electrode winding during welding of cut tabs to the electrode sheets. Sixth, the cell reliability may be increased by reducing the number of discrete welds required to fabricate a very low impedance cell.

Although there are numerous advantages to continuous— e.g., roll-to-roll processing of electrode materials for use in electrochemical storage cells, this disclosure is also consonant with batch-type processing. Furthermore, although examples of lithium-ion electrochemical storage cells are described, the electrochemical storage cell, methods and systems therefor described herein also apply to other types of electrochemical storage cells.

Finally, it will be understood that the articles, systems, and methods described hereinabove are embodiments of this disclosure-non-limiting examples for which numerous variations and extensions are contemplated as well. Accordingly, this disclosure includes all novel and non-obvious combinations and sub-combinations of the articles, systems, and methods disclosed herein, as well as any and all equivalents thereof.

The invention claimed is:

1. An electrochemical storage cell fabrication method, comprising:
    winding a first electrode sheet and a second electrode sheet around a cylindrical core to form a jellyroll structure;
    the first and second electrode sheets each comprising uncoated conductive edges parallel to end faces of the jellyroll structure and coated opposing surfaces between the uncoated conductive edges;
    winding a first separator sheet and a second separator sheet around the cylindrical core wherein the first and the second separator sheets are positioned between the first and second electrode sheets to mechanically and electrically separate the coated opposing surfaces of the first electrode sheet and the second electrode sheet and to mechanically and electrically separate the cylindrical core and the coated opposing surfaces; and
    cutting out slots from the uncoated conductive edges of the first and second electrode sheets to form slotted cutouts, wherein the slotted cutouts are angularly co-located relative to the cylindrical core upon forming the jellyroll structure.

2. The method of claim 1, further comprising compressing angularly co-located portions of the uncoated conductive edges at end faces of the jellyroll structure to the cylindrical core to electrically connect the uncoated conductive edges to each other, wherein the angularly co-located portions of the uncoated conductive edges are adjacent to the slotted cutouts.

3. The method of claim 1, further comprising inserting first and second conductive core inserts into opposite ends of the cylindrical core.

4. The method of claim 3, further comprising compressing the angularly co-located portions of the uncoated conductive edges at end faces of the jellyroll structure to the cylindrical core to electrically connect the uncoated conductive edges of the first electrode sheet to the first conductive core insert and to electrically connect the uncoated conductive edges of the second electrode sheet to the second conductive core insert.

5. The method of claim 1, further comprising compressing angularly co-located portions of the uncoated conductive edges that are adjacent to the slotted cutouts to the cylindrical core.

6. The method of claim 1, wherein the first and the second electrode sheets are electrically connected to the cylindrical core without welding conductive tabs to the first and second electrode sheets.

7. An electrochemical storage cell, comprising:
    a first electrode sheet and a second electrode sheet;
    the first and second electrode sheets wound around a cylindrical core forming a jellyroll structure; wherein the first and second electrode sheets each comprise uncoated conductive edges parallel to end faces of the jellyroll structure and coated opposing surfaces between the uncoated conductive edges;
    a first separator sheet and a second separator sheet, wherein the first and second separator sheets mechanically and electrically separate the coated opposing surfaces of the first and second electrode sheets and mechanically and electrically separate the cylindrical core and the coated opposing surfaces of the first electrode sheet; and
    slotted cutouts from the uncoated conductive edges, the slotted cutouts angularly co-located relative to the cylindrical core upon forming the jellyroll structure.

8. The electrochemical storage cell of claim 7, wherein portions of the uncoated conductive edges are compressed at locations adjacent to the slotted cutouts.

9. The electrochemical storage cell of claim 7, wherein portions of the uncoated conductive edges adjacent to the slotted cutouts are electrically connected to each other.

10. The electrochemical storage cell of claim 7, wherein the cylindrical core comprises a pair of flat opposing sides, and each of the flat opposing sides has a flattened ovular cross-section.

11. The electrochemical storage cell of claim 10, wherein portions of the uncoated conductive edges at the slotted cutouts are electrically connected to the cylindrical core at the flat opposing sides.

12. The electrochemical storage cell of claim 7, wherein a length of each of the slotted cutouts forms an arc length corresponding to an angle less than 180° upon forming the jellyroll structure.

13. The electrochemical storage cell of claim 7, wherein a lengthwise end of each of the slotted cutouts comprises a rounded shape.

14. The electrochemical storage cell of claim 7, wherein the slotted cutouts comprise a first and a second group of slotted cutouts, wherein the first and second group of slotted cutouts are angularly opposed at 180° relative to the cylindrical core.

15. The electrochemical storage cell of claim 7, further comprising first and second core inserts inserted into opposing ends of the cylindrical core.

16. The electrochemical storage cell of claim 7, wherein a width of the coated opposing surfaces may be less than or equal to a width of the first and second separator sheets.

17. An electrochemical storage cell fabrication method, comprising:
    winding a first electrode sheet and a second electrode sheet around a cylindrical core to form a jellyroll structure;
    the first electrode and the second electrode sheets comprising uncoated conductive edges parallel to end faces of the jellyroll structure and coated opposing surfaces between the uncoated conductive edges;
    winding a first separator sheet and a second separator sheet around the cylindrical core;
    modifying portions of the uncoated conductive edges of the first and second electrode sheets;
    after the modifying, contacting the modified portions of the uncoated conductive edge of the first electrode sheet with one another; and
    after the modifying, contacting the modified portions of the uncoated conductive edge of the second electrode sheet with one another.

18. The method of claim 17 wherein the first and the second separator sheets are positioned between the first and second electrode sheets to mechanically and electrically separate the coated opposing surfaces of the first electrode sheet and the second electrode sheet and wherein at least one of the first and second separator sheets is positioned to mechanically and electrically separate the cylindrical core and the coated opposing surfaces of the first electrode sheet.

19. The method of claim 17 wherein the modifying comprises forming apertures within the uncoated conductive edges of the first and second electrode sheets.

20. The method of claim 19 wherein the apertures are angularly co-located relative to the cylindrical core after the windings.

21. The method of claim 19 wherein the apertures are aligned with one another and form an opening that extends radially outward from the cylindrical core to an outer surface of the jellyroll structure after the windings.

22. The method of claim 19 wherein the forming apertures comprises forming prior to the winding the first and second electrode sheets around the cylindrical core.

23. The method of claim 19 wherein the apertures are slotted cutouts.

24. The method of claim 17 further comprising electrically coupling the modified portions of the uncoated conductive edge of the first electrode sheet with a first terminal and electrically coupling the modified portions of the uncoated conductive edge of the second electrode sheet with a second terminal.

25. The method of claim 17 further comprising electrically coupling the modified portions of the uncoated conductive edges of the first and second electrode sheets with the cylindrical core.

26. The method of claim 17 further comprising first electrically coupling the modified portions of the uncoated conductive edge of the first electrode sheet with a first core insert and second electrically coupling the modified portions of the uncoated conductive edge of the second electrode sheet with a second core insert.

27. The method of claim 26 wherein the first and second core inserts each comprise a pair of flat opposing sides, and further comprising contacting the modified portions of the uncoated conductive edges of the first and second electrode sheets with the flat opposing sides of respective ones of the first and second core inserts.

28. The method of claim 17 wherein at least one of the first separator sheet and the second separator sheet electrically insulates the cylindrical core from the coated opposing surfaces of the first electrode sheet.

29. The method of claim 17 wherein the contacting comprises bending the modified portions of the uncoated conductive edges of the first and second electrode sheets inwardly towards the cylindrical core.

30. The method of claim 17 wherein the winding the first and second separator sheets around the cylindrical core comprises separately winding the first and second separator sheets around the cylindrical core.

31. The method of claim 17 wherein other portions of the uncoated conductive edge of the first electrode sheet do not contact one another after the contactings and other portions of the uncoated conductive edge of the second electrode sheet do not contact one another after the contactings.

32. The method of claim 17 wherein the modified portions of the uncoated conductive edges of the first and second electrode sheets are positioned at different spaced locations around a circumference of the jellyroll structure.

33. The method of claim 17 wherein the windings comprise first winding the first separator sheet, second winding the first electrode sheet after the first winding, third winding the second separator sheet after the second winding, and fourth winding the second electrode sheet after the third winding.

34. The method of claim 17 wherein the modifying comprises modifying prior to the winding the first and second electrode sheets.

35. The method of claim 17 wherein the contactings comprise contactings after the windings.

36. An electrochemical storage cell fabrication method, comprising:
  winding a first electrode sheet and a second electrode sheet around a cylindrical core to form a jellyroll structure;
  the first electrode and the second electrode sheets comprising uncoated conductive edges parallel to end faces of the jellyroll structure and coated opposing surfaces between the uncoated conductive edges;
  winding a first separator and a second separator around the cylindrical core; and
  wherein the first and the second separators are positioned between the first and second electrode sheets to mechanically and electrically separate the coated opposing surfaces of the first electrode sheet and the second electrode sheet and to mechanically and electrically separate the cylindrical core and the coated opposing surfaces.

37. An electrochemical storage cell fabrication method, comprising:
  winding a first electrode sheet and a second electrode sheet around a cylindrical core to form a jellyroll structure;
  the first electrode and the second electrode sheets comprising uncoated conductive edges parallel to end faces of the jellyroll structure and coated opposing surfaces between the uncoated conductive edges;
  winding a first separator sheet and a second separator sheet around the cylindrical core; and
  cutting out slots from the uncoated conductive edges of the first electrode and the second electrode sheets to form slotted cutouts, wherein the slotted cutouts are angularly co-located relative to the cylindrical core upon forming the jellyroll structure.

* * * * *